United States Patent
Siess et al.

(10) Patent No.: US 12,276,546 B2
(45) Date of Patent: Apr. 15, 2025

(54) AMBIENT LIGHT SOURCE CLASSIFICATION

(71) Applicant: ams Sensors Germany GmbH, Jena (DE)

(72) Inventors: Gunter Siess, Kraftsdorf (DE); Frank Krumbein, Windischholzhausen (DE); Julius Komma, Jena (DE); Thomas Nimz, Rothenstein (DE); Mahmoud Jazayerifar, Jena (DE)

(73) Assignee: ams Sensors Germany GmbH, Jena (DE)

( * ) Notice: Subject to any disclaimer, the term of this patent is extended or adjusted under 35 U.S.C. 154(b) by 43 days.

(21) Appl. No.: 17/779,393

(22) PCT Filed: Nov. 27, 2020

(86) PCT No.: PCT/EP2020/083694
§ 371 (c)(1),
(2) Date: May 24, 2022

(87) PCT Pub. No.: WO2021/105398
PCT Pub. Date: Jun. 3, 2021

(65) Prior Publication Data
US 2022/0412798 A1    Dec. 29, 2022

Related U.S. Application Data

(60) Provisional application No. 62/941,261, filed on Nov. 27, 2019.

(51) Int. Cl.
*G01J 3/36*    (2006.01)
*G01J 3/02*    (2006.01)
(Continued)

(52) U.S. Cl.
CPC ............... *G01J 3/027* (2013.01); *G01J 3/36* (2013.01); *G01J 3/463* (2013.01); *H04N 9/73* (2013.01)

(58) Field of Classification Search
CPC . H04N 23/88; H04N 9/73; G01J 3/027; G01J 2003/466
See application file for complete search history.

(56) References Cited

U.S. PATENT DOCUMENTS 10,855,912 B2 * 12/2020 Pila ..................... H04N 23/60
2018/0082659 A1   3/2018 Jia et al.
(Continued)

FOREIGN PATENT DOCUMENTS

CN    101296302 A    10/2008
CN    107407600 A    11/2017
(Continued)

OTHER PUBLICATIONS

Tom Builds Stuff, "How to Match Paint Colors Accurately",https://www.youtube.com/watch?v=4W-RDBgWoeQ, Jul. 5, 2019 (Year: 2019).*

(Continued)

*Primary Examiner* — Maurice C Smith
(74) *Attorney, Agent, or Firm* — Michael Best & Friedrich LLP

(57) ABSTRACT

An image-sensing device is disclosed, the image-sensing device comprising a multispectral sensor and a processor communicably coupled to the multispectral sensor. The processor is configured to determine an ambient light source classification based on a comparison of predefined spectral data to data corresponding to an output of the multispectral sensor. Also disclosed is a method of classifying an ambient light source by sensing a spectrum of light with a multispectral sensor; and determining an ambient light source (Continued)

classification based on a comparison of predefined spectral data to data corresponding to an output of the multispectral sensor. An associated computer program, computer-readable medium and data processing apparatus are also disclosed.

18 Claims, 11 Drawing Sheets

(51) Int. Cl.
*G01J 3/46* (2006.01)
*H04N 9/73* (2023.01)

(56) References Cited

U.S. PATENT DOCUMENTS

| | | |
|---|---|---|
| 2019/0045162 A1 | 2/2019 | Krestyannikov |
| 2019/0149791 A1 | 5/2019 | Lee |
| 2019/0301932 A1 | 10/2019 | Sarkar et al. |

FOREIGN PATENT DOCUMENTS

| | | | | |
|---|---|---|---|---|
| EP | 1985981 A2 | * | 10/2008 | ............... G01J 1/42 |
| FR | 2985856 A1 | | 7/2013 | |
| JP | 2011064637 A | | 3/2011 | |
| KR | 101010460 B | | 1/2011 | |
| KR | 20160067633 A | * | 6/2016 | |
| WO | WO-2015104870 A1 | * | 7/2015 | ........... H04N 5/2256 |

OTHER PUBLICATIONS

Jay Tillu, "Mobile sensors: The Components that make our smartphones smarter", https://medium.com/jay-tillu/mobile-sensors-the-components-that-make-our-smartphones-smarter-4174a7a2bfc3 Dec. 2, 2018 (Year: 2018).*
International Search Report and Written Opnion for corresponding International Application No. PCT/EP2020/083694, dated Mar. 16, 2021.
Korean Intellectual Property Office Action for Application No. 1020227021243 dated May 16, 2024 (17 pages).
Chinese Patent Office Action for Application No. 202080082497 dated Oct. 1, 2024 (24 pages including English machine translation).
European Patent Office Action for Application No. 20816459.0 dated Dec. 16, 2024 (6 pages).
Chinese Patent Office Action for Application No. 202080082497 dated Dec. 21, 2024 (15 pages including English machine translation).
Korean Patent Office Action for Application No. 1020227021243 dated Jan. 9, 2025 (6 pages).

* cited by examiner

AMBIENT LIGHT SOURCE CLASSIFICATION

FIELD OF INVENTION

The present disclosure is in the field of image-sensing devices, and in particular image-sensing devices for classifying an ambient light source.

BACKGROUND

Color constancy is a desirable attribute of image-sensing devices, such as cameras. Color constancy refers to a capability of observing a feature or object as being of a relatively constant color under different illuminations. That is, an appearance of an image captured by a camera may be affected by an ambient illumination.

By means of example, if a color temperature of an ambient light source is relatively low, e.g. in the region of 3000 Kelvin as may be the case for an incandescent light source, an image of a white object exposed to the ambient light source will comprise a reddish hue. In contrast, for an ambient light source with a high color temperature, e.g. in the region of 6000 Kelvin as may be the case for daylight on an overcast day, the image of the white object will comprise a slight blueish hue. That is, the object will be observed by a camera as comprising a color that depends upon the illumination of the object by the ambient light source.

Such effects can be compensated for by means of white balancing, and preferably automatic white balancing (AWB), which is an image-processing step often employed in a digital cameras to adjust the coloration of images captured under different illuminations. Digital cameras often have predefined settings for typical lighting conditions such as daylight, fluorescent lighting or incandescent lighting, wherein in some instances the predefined settings may be automatically selected.

Existing techniques for white balancing include image processing by applying an algorithm based on a "Gray-World Theory" or a "White Patch Theory". The Gray World Theory is based on an assumption that the average reflectance in a captured image is achromatic. That is, the average of three color channels: red, green and blue, should be roughly equal. The White Patch Theory is based on an assumption that a brightest pixel in a captured image corresponds to a reflection of the ambient light source, and therefore the brightest pixel may correspond to a spectrum of the ambient illumination. Both approaches have known limitations and, notably, both approaches tend to produce substantially different results.

It is desirable to be able to correct a camera for the effects of ambient illumination on an image, without incurring the shortcomings of the prior art AWB methods.

It is therefore an aim of at least one embodiment of at least one aspect of the present disclosure to obviate or at least mitigate at least one of the above identified shortcomings of the prior art.

SUMMARY

The present disclosure relates to an image-sensing device capable of classifying an ambient light source, and a method for classifying an ambient light source. The image-sensing device may be found on a mobile device, such as a cellular telephone.

According to a first aspect, there is provided an image-sensing device comprising a multispectral sensor and a processor communicably coupled to the multispectral sensor, wherein the processor is configured to determine an ambient light source classification based on a comparison of predefined spectral data to data corresponding to an output of the multispectral sensor.

Advantageously, an accurate and reliable automatic white-balancing (AWB) of an image sensed by the image sensing device may be performed based on the on the ambient light source classification. Furthermore, by basing a classification of an ambient light source upon spectral information, AWB may be enhanced to actual lighting conditions and may, for example, be adapted as necessary to account for colored scenes.

The image-sensing device may comprise an image sensor communicably coupled to the processor.

The processor may be configured to adapt an image sensed by the image sensor based upon the ambient light source classification.

The processor may be configured to adapt the image by white-balancing the image based upon one or more parameters of the ambient light source classification.

The predefined spectral data may comprise a plurality of discrete spectra, each spectrum corresponding to a different ambient light source.

The processor may be configured to determine the ambient light source classification by identifying a closest match between one of the discrete spectra and a spectrum of the ambient light source.

The processor may be configured to reconstruct the spectrum of the ambient light source from the data corresponding to the output of the multispectral sensor.

The ambient light source classification may be a color temperature.

The ambient light source classification may be a color coordinate.

The processor may be configured to provide an indication of an accuracy of the determination of the ambient light source classification.

The processor may be configured to provide an indication of a likelihood of colour saturation of an/the image sensed by the image-sensing device.

A spectral range of the multispectral sensor may comprise visible light.

A spectral range of the multispectral sensor may comprise infra-red radiation.

A spectral range of the multispectral sensor comprises ultra-violet radiation.

The multispectral sensor may comprise a diffuser.

The multispectral sensor may comprise an optical filter. The optical filter may be configured to filter infra-red radiation and/or ultra-violet radiation.

The image sensor and the multispectral sensor may be configurable to operate sequentially or in parallel.

A field of view of the image sensor may be configurable.

A field of view of the multispectral sensor may be configurable.

A field of view of the multispectral sensor may be greater than a field of view of the image sensor.

The image-sensing device may be at least one of: a cellular telephone, a camera, an image-recording device; and/or a video recording device.

According to a second aspect there is provided a method for classifying an ambient light source, the method comprising the steps of: sensing a spectrum of light with a multispectral sensor; and determining an ambient light source classification based on a comparison of predefined spectral data to data corresponding to an output of the multispectral sensor.

The method may further comprises adapting an image sensed by an image sensor based upon the ambient light source classification. The image may be adapted by white-balancing the image based upon one or more parameters of the ambient light source classification.

The predefined spectral data may comprise a plurality of discrete spectra. Each spectrum of the plurality of discrete spectra may correspond to a different ambient light source.

The method may further comprise a step of reconstructing the spectrum of the ambient light source from the data corresponding to the output of the multispectral sensor.

The method may further comprise a step of determining the ambient light source classification by identifying a closest match between one of the discrete spectra and a spectrum of the ambient light source.

According to a third aspect there is provided a computer program, the computer program comprising instructions which, when the program is executed by a computer, cause the computer to carry out the method according to the second aspect.

According to a fourth aspect there is provided a computer-readable medium having stored thereon the computer program of the third aspect.

According to a fifth aspect there is provided a data processing apparatus comprising a memory and a processor adapted to carry out the method according to the second aspect.

The above summary is intended to be merely exemplary and non-limiting. The disclosure includes one or more corresponding aspects, embodiments or features in isolation or in various combinations whether or not specifically stated (including claimed) in that combination or in isolation. It should be understood that features defined above in accordance with any aspect of the present disclosure or below relating to any specific embodiment of the disclosure may be utilized, either alone or in combination with any other defined feature, in any other aspect or embodiment or to form a further aspect or embodiment of the disclosure.

BRIEF DESCRIPTION OF DRAWINGS

These and other aspects of the present disclosure will now be described, by way of example only, with reference to the accompanying drawings, which are:

FIG. 1b depicts a cross-sectional view of a portion of the image-sensing device of FIG. 1a;

DETAILED DESCRIPTION OF DRAWINGS

Figure 1A:
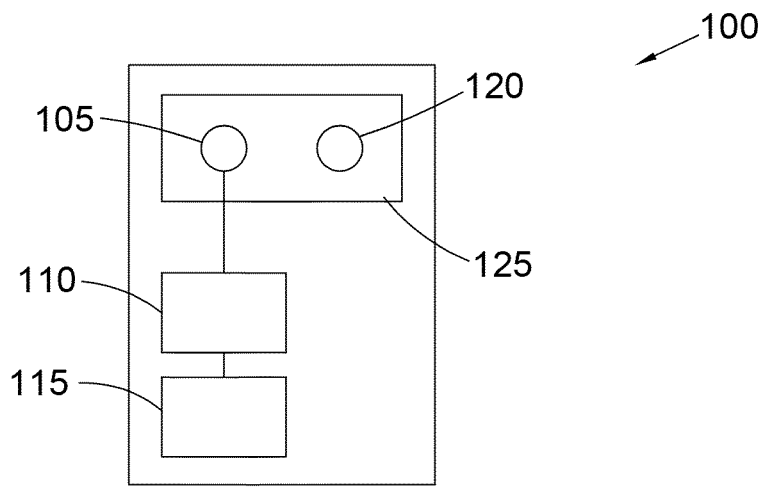
FIG. 1a depicts an image-sensing device according to an embodiment of the disclosure.

FIG. 1a depicts an image-sensing device, generally denoted 100, according to an embodiment of the disclosure. The image-sensing device 100 comprises a multispectral sensor 105 and a processor 110 communicably coupled to the multispectral sensor 105. The example image-sensing device 100 of FIG. 1 is a cellular telephone. It will be appreciated that the disclosure descried herein may be embodied in other image-sensing devices, such as a camera, an image-recording device, a video recording device, a laptop or tablet device, a web-cam, or the like.

The processor 110 may comprise one or more processors and/or microcontrollers and/or microprocessors. The image-sensing device 100 may comprise one or more memories 115, wherein the one or more memories are coupled to the processor 110. The one or more memories 115 may comprise, e.g. be configured to store, program code for execution by the processor 110 and/or data, such as data corresponding to one or more images sensed by an image-sensor 120 and/or data corresponding to an output of the multispectral sensor 105.

The image-sensing device 100 comprises an image-sensor 120. The image-sensor 120 may be, for example, a charge-coupled device (CCD) sensor or a Complementary Metal-Oxide-Semiconductor (CMOS) image-sensor. The image-sensor 120 may comprise an array of pixels, wherein each pixel within the array comprises a photodetector, such as a photodiode, and one or more transistors to control and/or activate the pixel.

More generally, the image-sensor 120 may comprise, for example a camera.

In the example image-sensing device 100 of FIG. 1, the multispectral sensor 105 and the image-sensor 120 are protected by a cover 125, as will be described in more detail with reference to FIG. 1b. The cover 125 is transparent to a range of wavelengths of light to which the image-sensor 120 and the multispectral sensor 105 are sensitive. Preferably, the cover 125 is a glass cover.

Figure 1B:
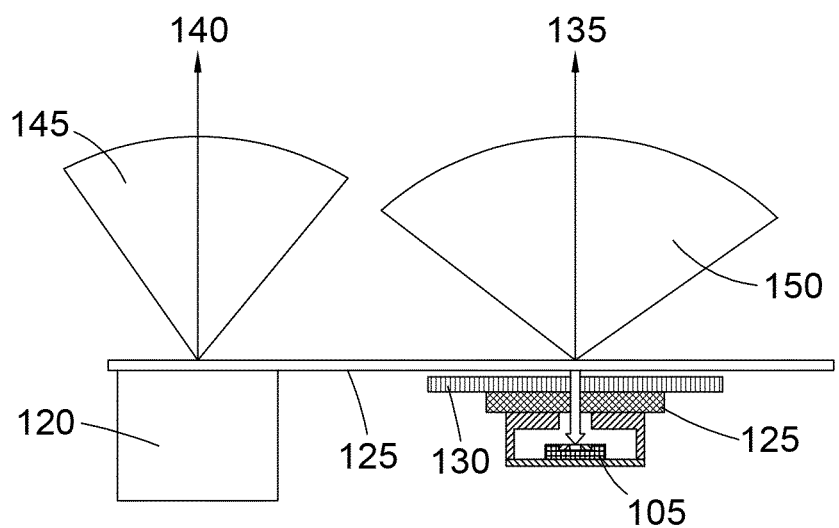

FIG. 1b shows a cross-sectional view of a portion of the image-sensing device 100 of FIG. 1a. In the example embodiment of FIG. 1b, the multispectral sensor 105 is disposed behind an infra-red filter 125. The infra-red filter 125 is configured to inhibit infra-red radiation from reaching the multispectral sensor 105, thus limiting spectral cross-talk sensed by the multispectral sensor 105. It will be appreciated that in other embodiments, the filter 125 may be configured for a different range of wavelengths of radiation, such as ultra-violet radiation and/or at least a portion of the visible light spectrum. In yet further embodiments, multispectral sensor 105 may not be disposed behind a filter.

The image-sensing device 100 comprises a diffuser 130. Preferably the diffuser 130 is disposed between the cover 125 and the multispectral sensor 105, to diffuse light prior to the light being incident upon, e.g. sensed by, the multispectral sensor 105. The diffuser 130 may be translucent to a range of wavelengths of light to which the multispectral sensor 105 is sensitive.

In a preferred embodiment, the viewing direction 135 of the multispectral sensor 105 is substantially the same as the viewing direction 140 of the image-sensor 120. As such, the multispectral sensor 105 may be configured to sense the ambient light of an image sensed by the image-sensor 120, as described in more detail below.

In a preferred embodiment, a field of view 145 of the image-sensor 120 is smaller than a field of view 150 of the multispectral sensor 105. As such, the multispectral sensor 105 may be configured to sense the ambient light from a larger area, e.g. a larger proportion of a scene, than is sensed by the image-sensor 120.

It will be appreciated that in alternative embodiments, the field of view 145 of the image-sensor 120 may be the same as, or even greater than, the field of view 150 of the multispectral sensor 105. Similarly, in some embodiments, the viewing direction 140 of the image-sensor 10 may differ from the viewing direction 135 of the multispectral sensor 105. For example, the multispectral sensor 105 may be mounted on, mounted within, mounted under or coupled to a different surface or portion of the image-sensing device 100.

Figure 2:
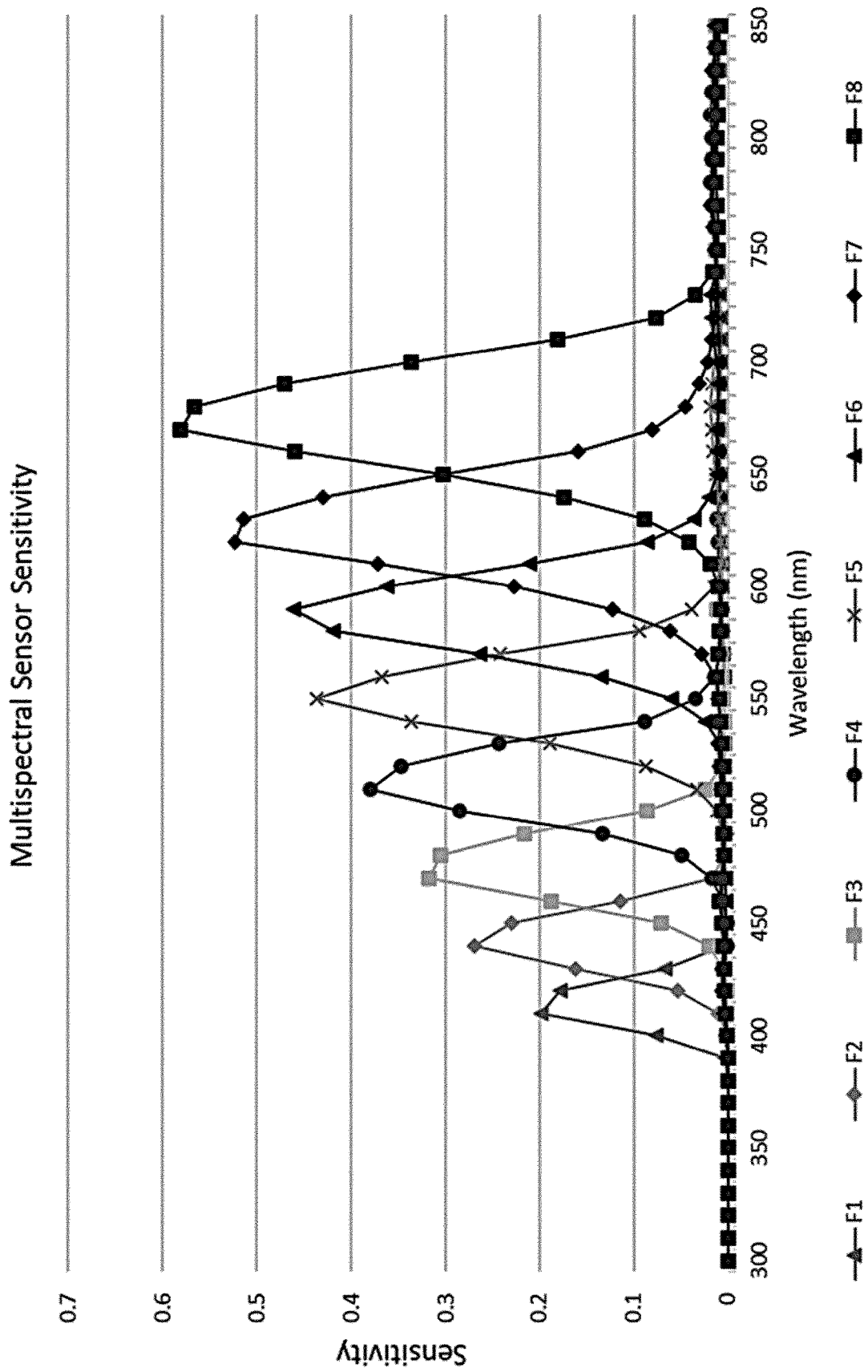
FIG. 2 depicts an example response of a multispectral sensor.

An example response of the multispectral sensor 105 is depicted in FIG. 2. The multispectral sensor 105 may be configured to sense wavelengths of radiation spanning at least a portion of the visible light spectrum. For example, the multispectral sensor 105 may be a multi-channel multispectral sensor, with optical channels distributed over the visible range. In a preferred embodiment, the multispectral sensor 105 is an "AS7341 11-Channel Spectral Color Sensor" which exhibits a spectral response defined by wavelengths of radiation in the range of approximately 350 nm to 1000 nm.

A multispectral sensor may provide a non-ideal response. A non-ideal response of the multispectral sensor 105 may defined in a correction matrix, M, which can be multiplied by raw-data measured by the multispectral sensors to reconstruct sensed spectra. For example, reconstruction of a spectrum based may be calculated as follows:

$$\text{sensed spectra} = M * \text{raw\_value}$$

wherein raw_value is a vector of dimension k, and each element in vector raw_value corresponds to a count of a sensor channel. Correction matrix M has dimensions w×k, wherein w corresponds to a wavelength, for example ranging from 300 nm to 1100 nm in increments of 1 nm, and k corresponds to the sensor channel. That is, each entry in matrix M effectively corresponds to a weighting factor, which may represent a sensor channel count for a particular wavelength. As such, multiplication of the correction matrix M by the raw_value provides a matrix corresponding to the sensed spectra, wherein the non-ideal response of the multispectral sensor has been compensated for.

In the example embodiment of the image-sensing device 100 of FIG. 1, the processor 110 may be configured to reconstruct sensed spectra. The correction matrix M for the multispectral sensor 105 may, for example, be stored in the memory 115. Similarly, reconstructed sensed spectra may also be stored, such as temporarily stored, in the memory 115, for further processing as will be described below with reference to FIGS. 4a and 4b.

Figure 3:
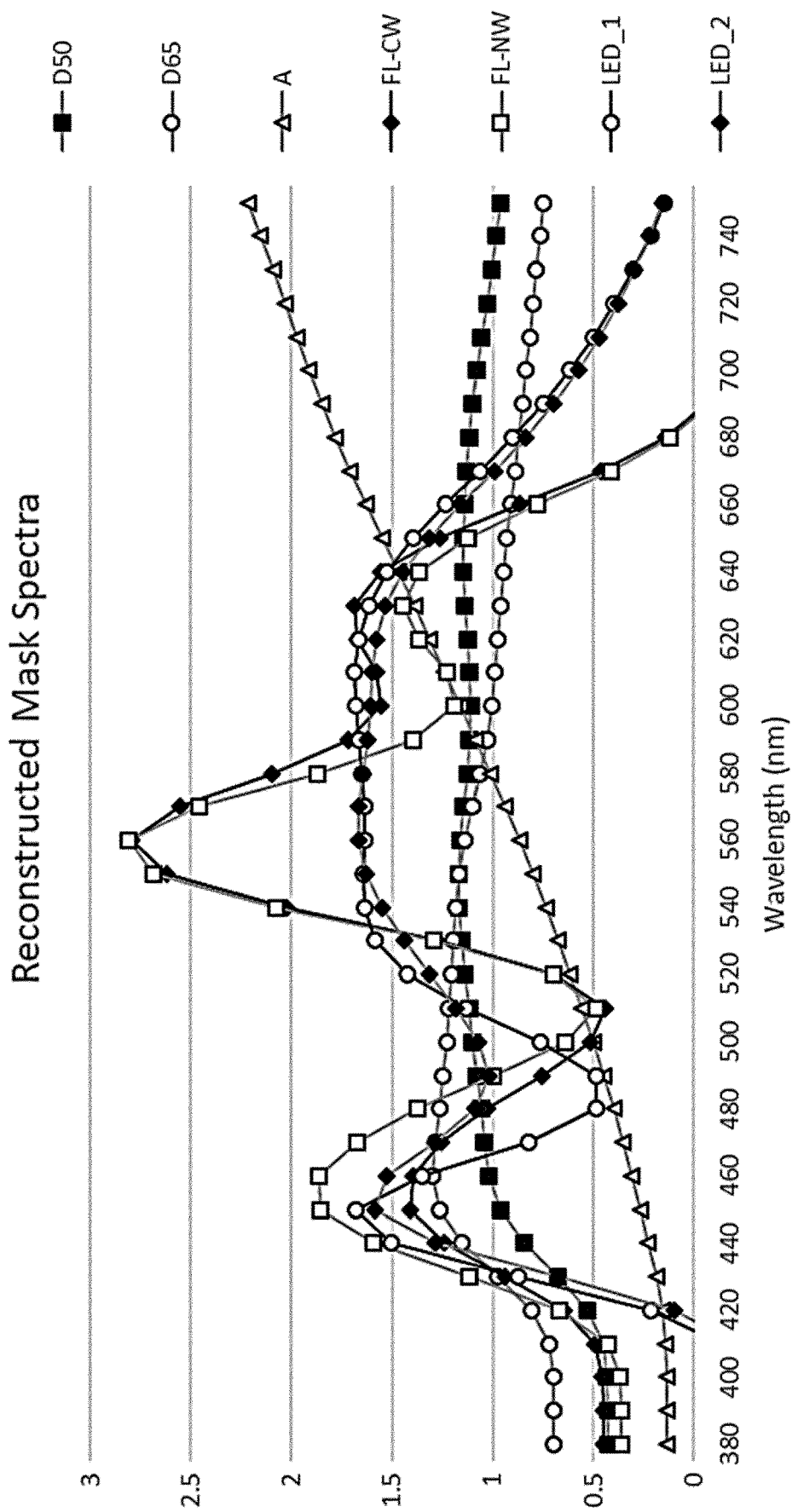
FIG. 3 depicts spectra for a range of defined ambient light sources.

FIG. 3 depicts spectra for a range of defined ambient light sources, denoted D50, D65, A, FL-CW, FL-NW, LED1, and LED2. Each spectrum corresponds to a different ambient light source and a different color temperature. For example, D65 corresponds a light bluish color light source comparable to average daylight, with a color temperature of approximately 6500K. D50 corresponds to a generally whiter light source, with a color temperature of approximately 5000K.

That is, predefined spectral data may comprise a plurality of discrete spectra, each spectrum corresponding to a different ambient light source.

The spectra depicted in FIG. 3 may be stored in the image-sensing device 100. For example, the spectra, e.g. data representing the spectra, may be stored in a look-up table (LUT) in the memory 115. It will be appreciated that, in other embodiments, the spectra may be stored in any format, such as a matrix, a series of separate files, in an encoded format, or the like. Furthermore, each spectrum may alternatively or additionally be represented as a model that approximates the spectrum over a range of wavelengths. For example, in one embodiment an nth-order polynomial approximation may be performed by the processor 110 to calculate one or more spectra based on defined coefficients.

Furthermore, it will be appreciated that the spectra shown in FIG. 3 are selected for purposes of example only. Spectra corresponding to other ambient light sources may be additionally or alternatively be represented, such as industry standard light sources D75, WWF, TL84, TI830, TL835, SPX35, U30, U35, Tungsten, Illuminant A, B, C or E, Illuminant Series D such as D75 or the like, Illuminant series E, F or L, Horizon, CWF, or the like. This list is non-exhaustive and is provided for purposes of example only. Other spectra, such as non-industry standard spectra may additionally or alternatively be used.

In one embodiment, the spectra and/or associated color temperature and/or coordinates on a chromaticity diagram or map are stored in a LUT, wherein each entry or group of entries in the LUT corresponds to an index. For purposes of example, an index may be denoted "$CCT\_LUT_{index}$".

In addition to storing spectra as described above, a color temperature, e.g. a correlated color temperature (CCT), and/or coordinates corresponding to a point in a chromaticity diagram or map, may also be stored in the mage-sensing device 100. That is, each spectra has an associated color temperature and/or coordinates additional stored in the memory 115. An example of a chromaticity diagram is described below with reference to FIG. 6c.

Figure 4A:
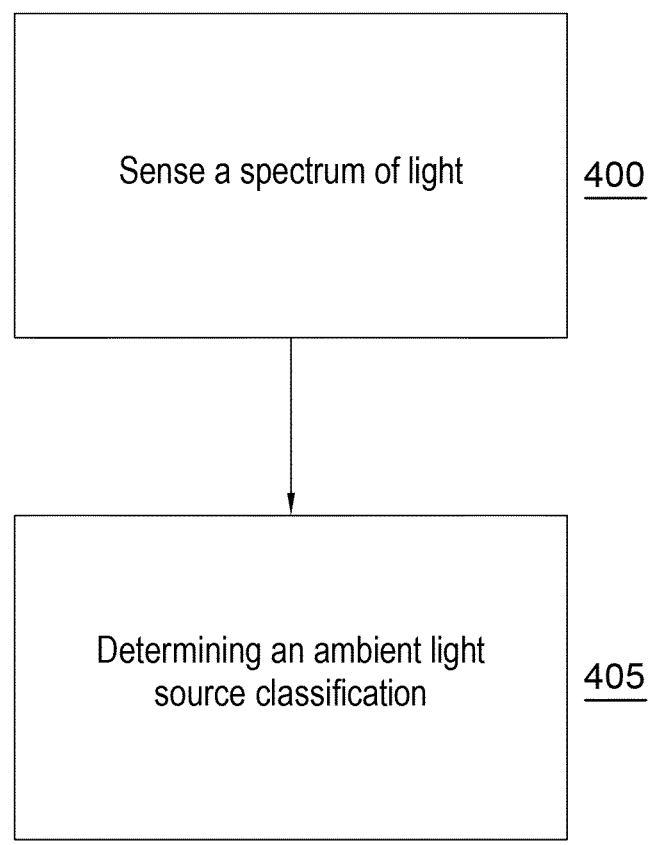
FIG. 4a is a flow diagram corresponding to a determination of an ambient light source classification, according to an embodiment of the disclosure.

FIG. 4a depicts a method for classifying an ambient light source. The method comprises a first step 400 of sensing a spectrum of light with a multispectral sensor.

The method also comprises a second step 405 of determining an ambient light source classification based on a comparison of predefined spectral data to data corresponding to an output of the multispectral sensor.

A further embodiment will now be described with reference to FIG. 4b, which shows a flow diagram corresponding to a determination of an ambient light source classification by an image-sensing device 100, based on a comparison of predefined spectral data to data corresponding to an output of the multispectral sensor 105. The classification may be a color temperature or a color coordinate, e.g. a color coordinate on a chromaticity diagram, as described in more detail below. Furthermore, FIG. 4b also depicts how the processor 110 may be configured to provide an indication of an accuracy of the determination of the ambient light source classification, and an indication of a likelihood of color saturation of an image sensed by the image-sensing device 100.

At a first step, 410, the multispectral sensor 105 of the image-sensing device 100 is configured to sense a spectrum of light, e.g. an ambient light. The multispectral sensor 105 may be configured to sense a plurality of spectra of ambient light. In FIG. 4b, the sensed spectra are denoted "Spectra$_n$", wherein n is an integer corresponding to a particular spectrum from a range of sensed spectra.

The image-sensor 120 may additionally sense an image, preferably at substantially the same time as the multispectral sensor 105 senses the ambient light.

In a preferred embodiment, an output of the multispectral sensor 105 is stored in the memory 115, although it will be appreciated that some or all of the output of the multispectral sensor 105 may be stored directly in the processor 110, such as in a local memory or registers of the processor 110 as temporary or intermediate data.

As described above with respect to FIGS. 3, raw-data corresponding to an output from the multispectral sensor 105 may be used to reconstruct spectra corresponding to the sensed ambient light. That is, raw-data corresponding to an output from the multispectral sensor 105 may be multiplied by a correction matrix by the processor 110 to determine spectra corresponding to the sensed ambient light. A color temperature and/or chromaticity diagram coordinates associated with the determine spectra corresponding to the sensed ambient light may be calculated and additionally stored in the memory 115.

At step 415 the reconstructed spectra is compared with the spectra of the defined light sources stored in the LUT. The method of comparison is described in more detail with reference to FIGS. 5a to 5c. The comparison is made over a range of wavelengths of interest. For example, in the example of FIG. 4b, the comparison is made over the visible wavelength range of 380 nm to 750 nm.

Figure 4B:
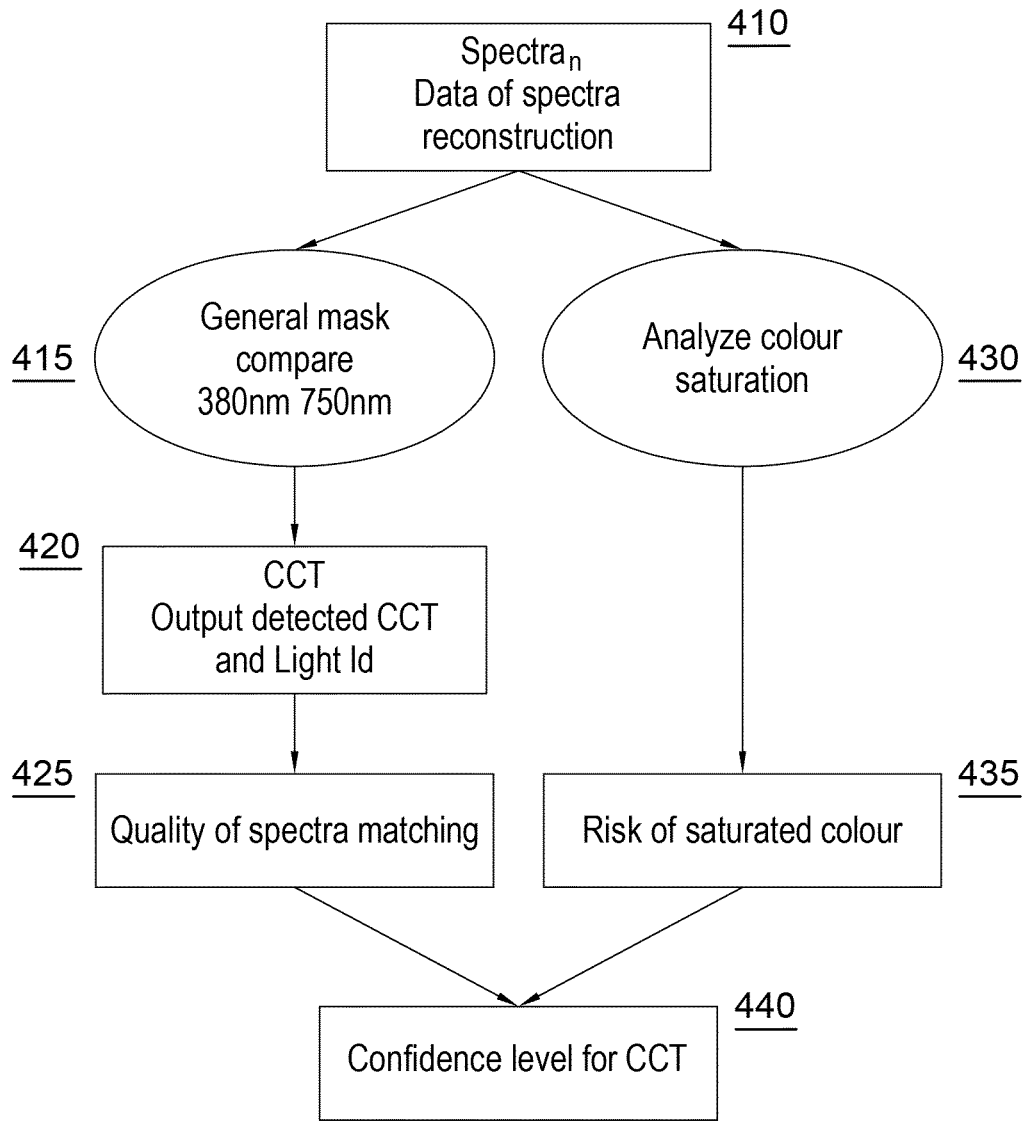
FIG. 4b is a flow diagram corresponding to a determination of an ambient light source classification, according to a further embodiment of the disclosure.

An output of the comparison, denoted by step 420 in FIG. 4b, is a CCT and/or a classification of an ambient light source, e.g. a selection of a defined light source from the light sources described in the LUT. The classification of the defined light source may be an index, e.g. CCT_LUT$_{index}$.

The processor 110 may be configured to white-balance an image sensed by the image-sensor 120 based upon one or more parameters of the ambient light source classification, e.g. based upon the CCT and/or the chromaticity diagram coordinates.

At optional step 425, the processor 110 may be configured to determine a quality of the spectra matching, e.g. a closeness of a match between the spectra of the sensed ambient light and the spectra of the defined light sources in the LUT. The quality of the match may contribute to an overall indication of a confidence level of the classification of an ambient light source, as indicated at step 440.

At step 430 the reconstructed spectra corresponding to the sensed ambient light is analyzed to determine a degree of color saturation that may be present in an image sensed by the image-sensor 120, as will be described in more detail below with reference to FIGS. 6a and 6b. The analysis 430 provides an indication of a risk of color saturation, indicated by step 435. The determined degree of color saturation may additionally contribute to the overall indication of a confidence level of the classification of the ambient light source, as indicated at step 440.

Figure 5A:
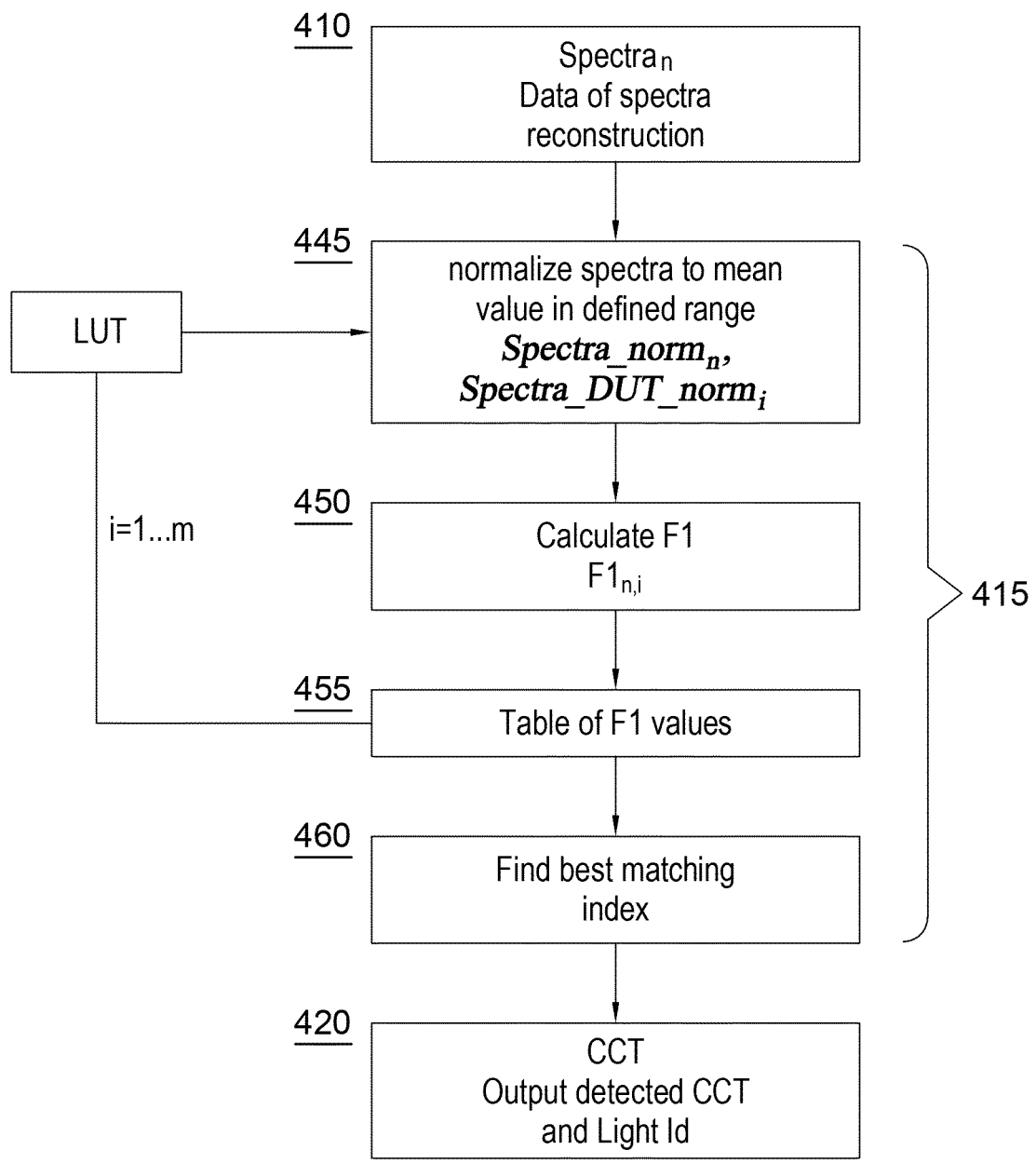
FIG. 5a depicts a method of comparing reconstructed spectra with spectra of the defined light sources stored in a look up table (LUT)

FIG. 5a depicts step 415 in more detail. In a first step 445, each spectrum from the spectra stored in the LUT is normalized. For example, the normalized spectra may be calculated as follows:

$$\text{Spectra\_LUT\_norm}_i = \frac{\text{Spectra\_LUT}_i}{\text{Average (Spectra\_LUT}_i)}$$

wherein Spectra_LUT$_i$ is one of i spectra stored in the LUT, Average (Spectra_LUT$_i$) is the average magnitude of Spectra_LUT$_i$ over the wavelength of interest, and Spectra_LUT_norm$_i$ is the normalized spectra.

Figure 5B:
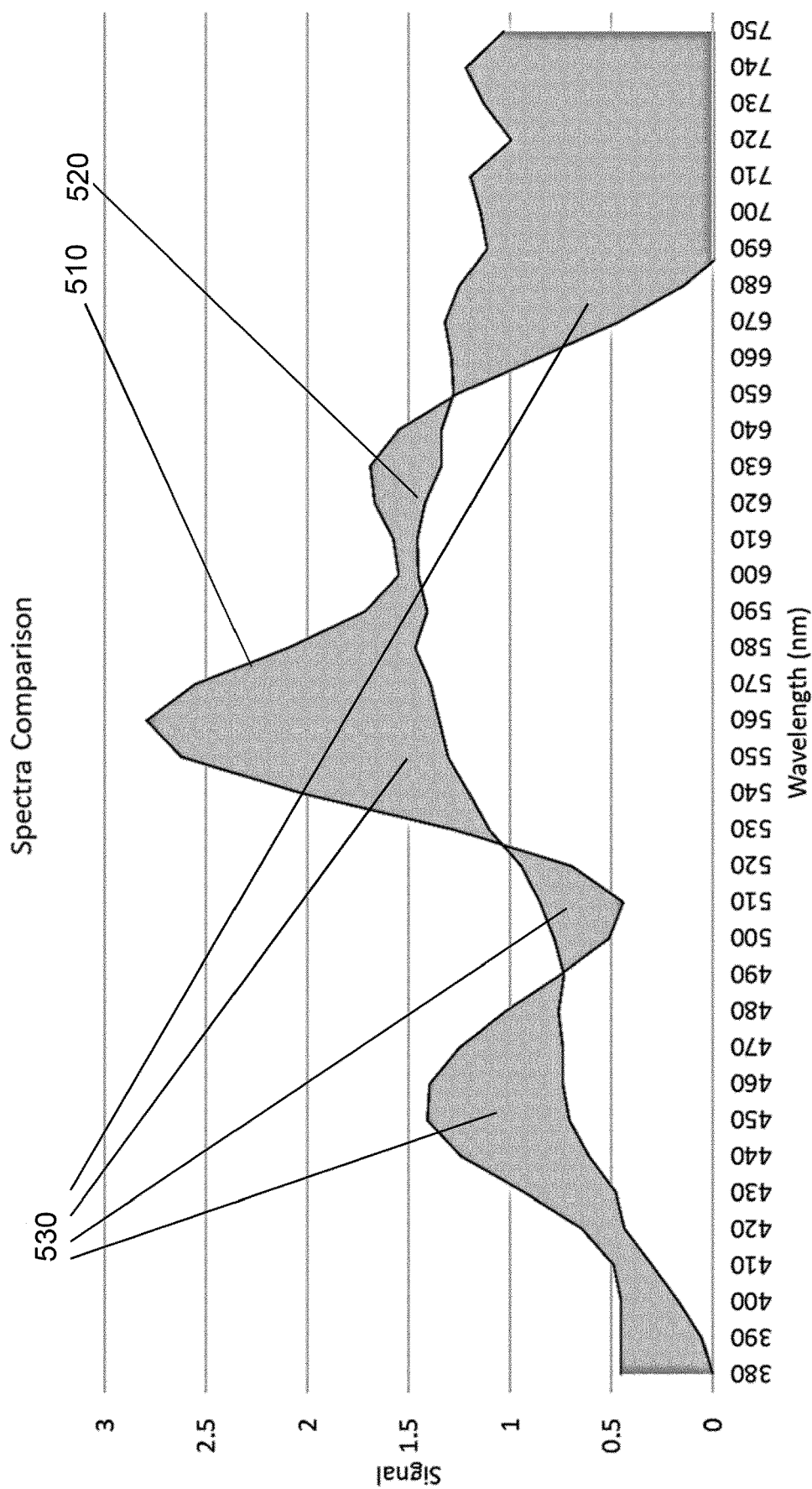
FIG. 5b is a graph depicting the method of comparing reconstructed spectra with spectra of the defined light sources stored in the LUT.

This is represented graphically in FIG. 5b, wherein for purposes of example the normalized spectra 510 for an ambient light source over a range of wavelengths from 380 to 750 nm is depicted.

It will be appreciated that, in alternative embodiments, the spectra may be stored in the LUT in a normalized state, thus obviating a requirement to calculate the normalized spectra each time a comparison is performed.

The spectra of the ambient light sensed by the multispectral sensor 105 of the image-sensing device 100 also normalized as follows:

$$\text{Spectra\_DUT\_norm}_n = \frac{\text{Spectra\_DUT}_n}{\text{Average (Spectra\_DUT}_n)}$$

wherein: Spectra_DUT$_n$ is the nth spectrum of the ambient light sensed by the multispectral sensor 105, otherwise referred to as the spectra of the Device Under Test (DUT); Average (Spectra_DUT$_n$) is the average magnitude of Spectra_DUT$_n$ over the wavelength of interest, and Spectra_DUT_norm$_n$ is the normalized spectra.

This is represented graphically in FIG. 5b, wherein the normalized spectra 520 for a sensed ambient light source over a range of wavelengths from 380 to 750 nm is depicted.

In a next step 450, a deviation between the normalized spectra 510 of the defined light source, e.g. D65 for example, and the normalized spectra 520 of the sensed ambient light source is calculated to determine a fitting parameter F1$_i$ as follows:

$$F1_{n, i=1 \ldots m} = \frac{\sum_{\lambda=min}^{\lambda=max} \text{Spectra\_DUT\_norm}_n(\lambda) - \text{Spectra\_LUT\_norm}_i(\lambda)}{\lambda_{max} - \lambda_{min}}$$

wherein $\lambda_{max}$ corresponds to a maximum wavelength of the range of interest and $\lambda_{min}$ corresponds to a minimum wavelength of the range of interest. For example, in FIG. 5b, $\lambda_{max}$ is 750 nm and $\lambda_{min}$ is 380 nm.

The fitting parameter F1$_n$ is, in effect, the accumulated difference between the normalized spectrum 520 stored in the LUT and the normalized spectra 510 of the ambient light sensed by the multispectral sensors 105, e.g. a difference between the integral of the over the range of wavelengths from λmax to λmin. This is represented by the shaded areas 530 in FIG. 5b.

This process is repeated until fitting parameters F1$_n$ have been calculated for each of the n entries in the LUT, as represented at step 455. As such, an indexed table of fitting parameters F1$_n$ is calculated, wherein a fitting parameter F1$_n$ is associated with each of n entries e.g. each spectrum of n spectra, stored in the LUT.

Finally, at step 460, the fitting parameter with the smallest magnitude is identified. The fitting parameter with the smallest magnitude corresponds to an index of the LUT that defines the sensed ambient light source. That is, by identifying the normalized spectrum of the defined light source in the LUT that has the minimum deviation from a normalized spectrum of an ambient light source, the ambient light source can be classified as one of the defined light sources in the LUT.

As such, the processor 110 may be configured to determine the ambient light source classification by identifying a closest match between one of the discrete spectra and a spectrum of the ambient light source.

As a practical example, wherein a stored LUT comprises the spectra of D50, D65, A, FL-CW, FL-NW, LED1, and LED2 ambient light sources as shown in FIG. 2, if the normalized spectrum of the D65 ambient light source has the smallest deviation from the normalized spectrum of a sensed ambient light source, then the sensed ambient light source would be classified as a D65 ambient light source.

The magnitude of the deviation between the normalized spectrum of the defined light source, e.g. D65, and the normalized spectrum of a sensed ambient light source may be indicative of a confidence level on the accuracy of the classification. A relatively large deviation would represent a low degree of confidence and a relatively small deviation would represent a high degree of confidence. That is, considering the graph of FIG. 5b, a smaller shaded area 530 represents a higher confidence level.

In an example embodiment, a threshold may be determined. If the confidence level, e.g. the magnitude of the deviation, is above the threshold it may be determined that the classification is unreliable and, for example, automatic white-balancing should not be performed.

Figure 5C:
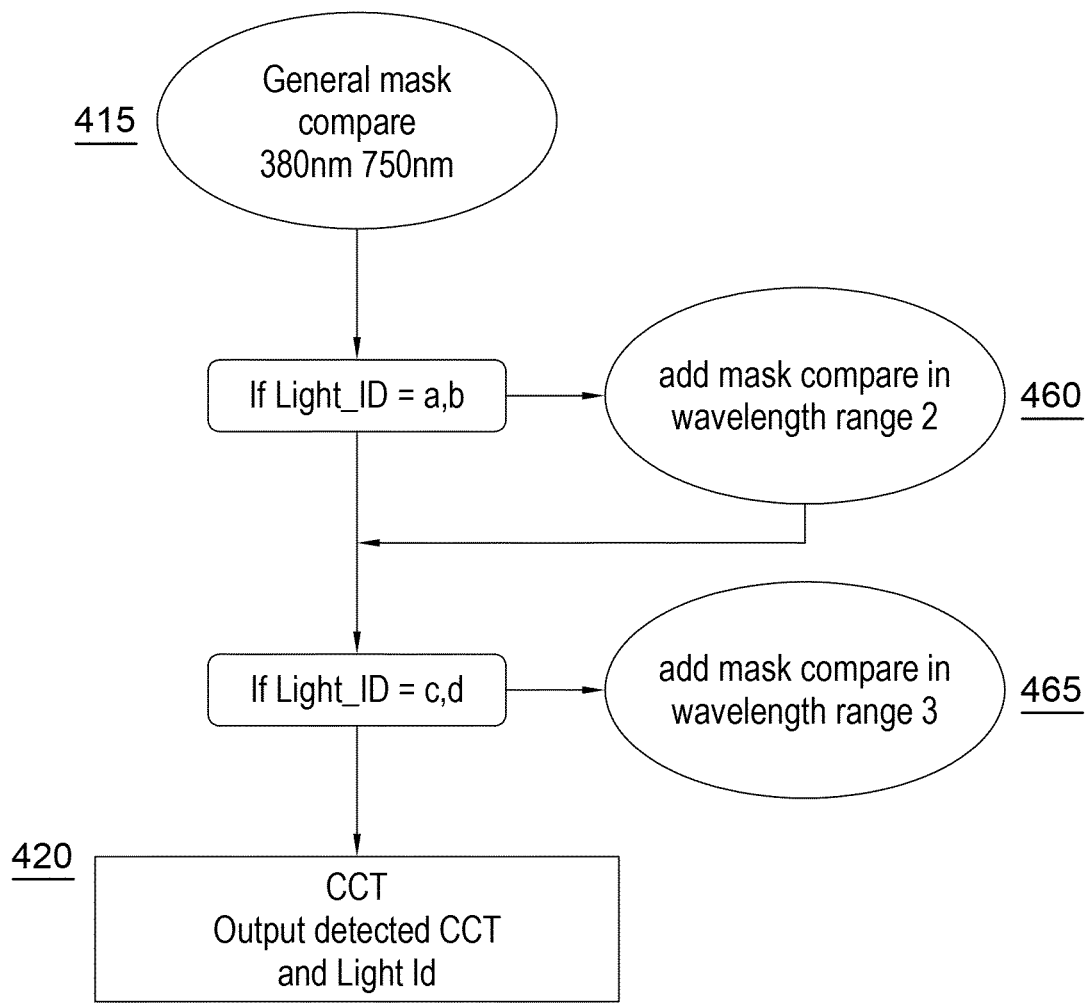
FIG. 5c depicts a method of comparing reconstructed spectra with spectra of the defined light sources stored in the LUT over a restricted range of wavelengths.

Furthermore, if the fitting parameter $F1_n$ has a large magnitude high, indicating a low degree of confidence based on a comparison made over the entire spectral range of interest, e.g. 380 nm to 750 nm in the examples of FIGS. 3 and 5c, then one or more further comparisons can be made over a sub-range of the entire spectral range of interest. This may be particularly beneficial in the instances wherein the fitting parameter $F1_n$ with the smallest magnitude differs from the fitting parameter $F1_n$ with the second smallest deviation by an amount below a defined threshold, e.g. two or more fitting parameters are similar. Furthermore, this may be beneficial where the multispectral sensor 105 is exposed to multiple ambient light sources.

FIG. 5c shows a simplified example wherein, following a comparison across a range of wavelengths from 380 nm to 750 nm at step 415, the ambient light source may be classified as either ambient light source "a" or ambient light source "b", e.g. light sources "a" and "b" exhibit normalized spectra with comparable deviations between the normalized spectrum of the sensed ambient light. In this case, a further analysis may be performed over a restricted range of wavelengths, denoted "wavelength range 2" in step 460 of FIG. 5c. The maximum and minimum wavelengths of "wavelength range 2" may be, at least in part, based on characteristics of ambient light source "a" and light source "b". For example, if ambient light source "a" and ambient light source "b" correspond to generally reddish ambient light sources, e.g. ambient light sources with a color temperature in the region of 2000K to 3000K, then the restricted range of wavelengths may, for example, be in the region of 600 to 750 nm.

As further depicted in the example of FIG. 5c, the ambient light source may alternatively be classified as either ambient light source "c" or ambient light source "d", e.g. light sources "c" and "d" exhibit normalized spectra with comparable deviations between the normalized spectrum of the sensed ambient light. In this case, a further analysis may be performed over a restricted range of wavelengths, denoted "wavelength range 3" at step 465 in FIG. 5c. The maximum and minimum wavelengths of "wavelength range 3" may be, at least in part, based on characteristics of ambient light source "c" and light source "d". For example, if ambient light source "c" and ambient light source "d" correspond to generally blueish ambient light sources, e.g. ambient light sources with a color temperature in the region of 5000K to 6000K, then the restricted range of wavelengths may, for example, be in the region of 380 to 600 nm.

As described above, the processor 110 may also be configured to provide an indication of a likelihood of color saturation of an image sensed by the image-sensing device 100. A degree of color saturation of an image corresponds to an intensity of a particular color in an image.

Figure 6A:
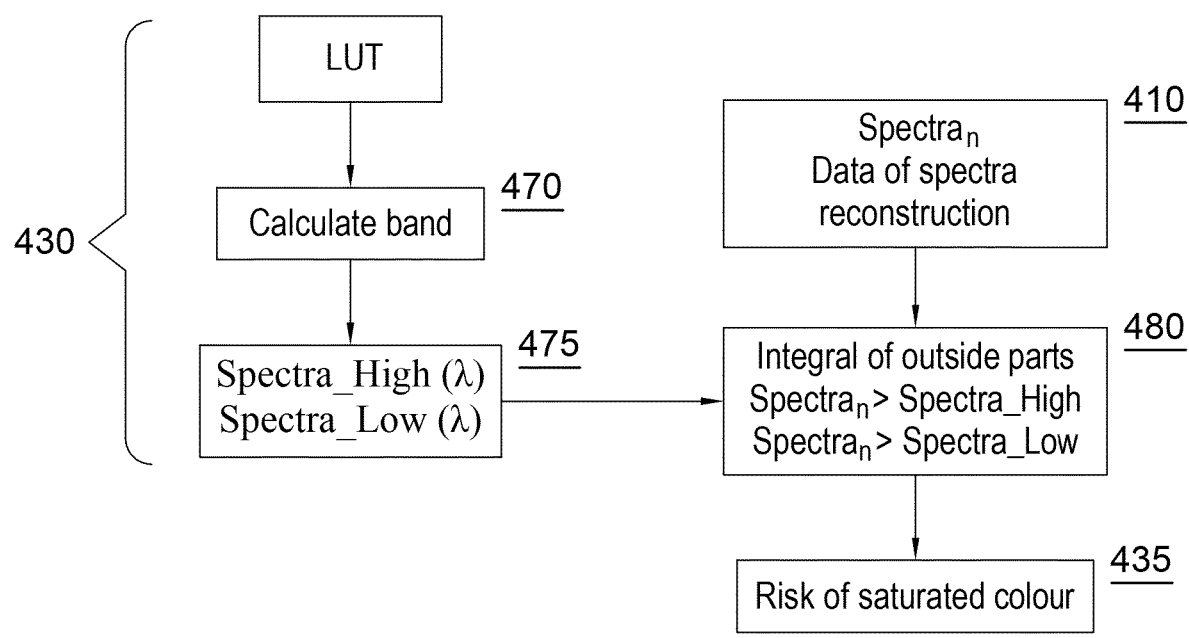
FIG. 6a depicts a method of determining a degree of color saturation.
Figure 6B:
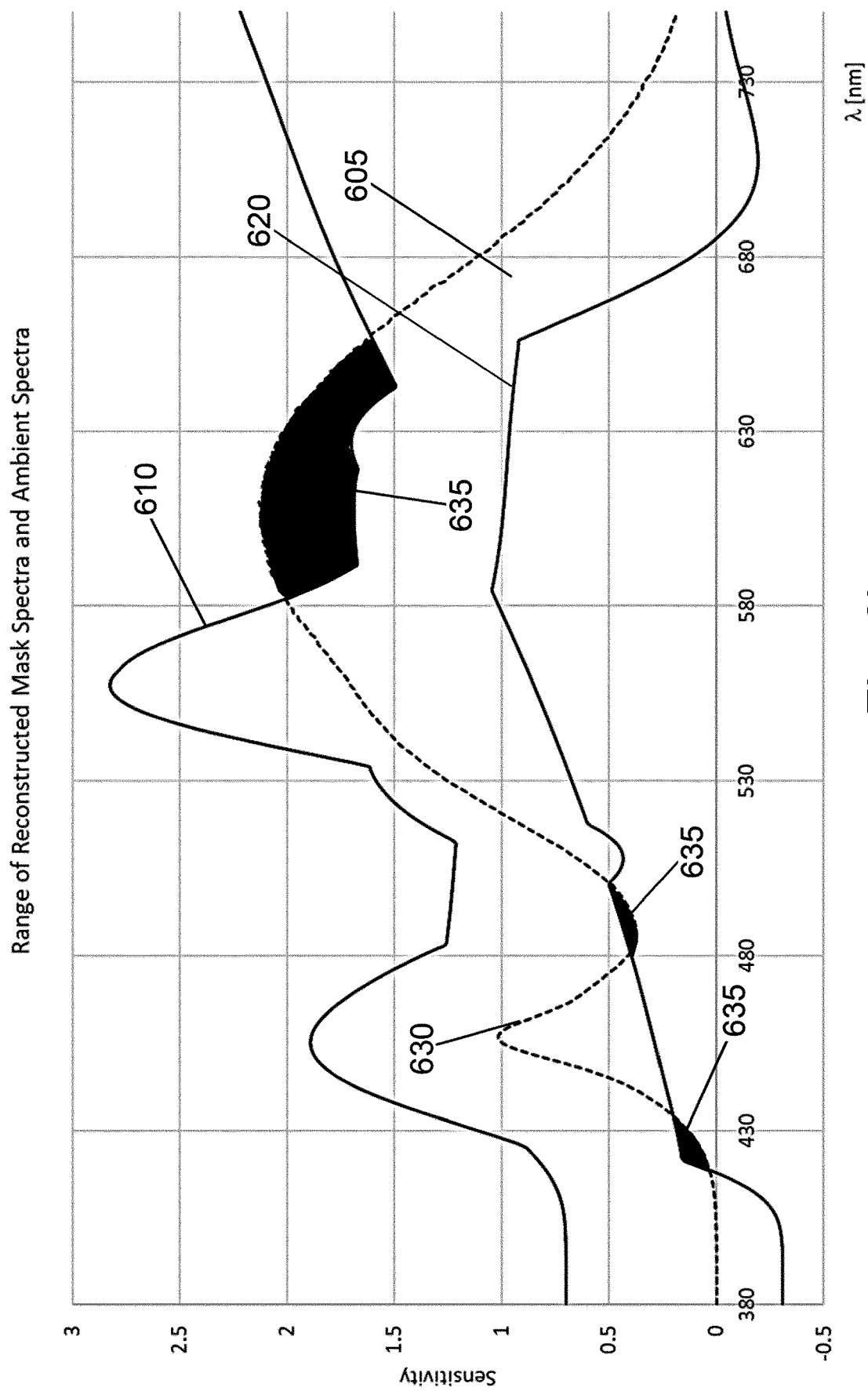
FIG. 6b is a graph depicting the method of determining a degree of color saturation.

FIGS. 6a and 6b depict an example of how the sensed ambient light, denoted "Spectra$_n$," in FIG. 6a, may be analyzed to determine a degree of color saturation that may be present in an image sensed by the image-sensor 120, as depicted at step 430 of FIG. 4b.

At step 470 in FIG. 6a, which may represent an initial or intermediate step, a band 605 defining a range between the maximum and minimum values for each wavelength over the range of wavelengths of interest is calculated. This is shown in FIG. 6b, wherein an upper line 610, denoted "Spectra_High ($\lambda$)" at step 475 in FIG. 6a, corresponds to the maximum value of all of the spectra stored in the LUT, and a lower line 620, denoted "Spectra_Low ($\lambda$)" at step 475 in FIG. 6a, corresponds to the minimum value of all of the spectra stored in the LUT.

That is, by comparing FIG. 6b with FIG. 2, it can be see that the upper line 610 corresponds to a maximum of all of the spectra, e.g. D50, D65, A, FL-CW, FL-NW, LED_1 and LED_2, stored in the LUT. Similarly, by comparing FIG. 6b with FIG. 2, it can be see that the lower line 620 corresponds to a minimum of all of the spectra, e.g. D50, D65, A, FL-CW, FL-NW, LED_1 and LED_2, stored in the LUT.

Also shown in FIG. 6b is a sensed spectrum 630, denoted "Spectra$_n$," in FIG. 6a. The sensed spectrum 630 is denoted by a dashed line.

At step 480, an analysis is performed to determine an integral of a deviation of the sensed spectrum 630 from the band 605. The integral of the deviation is represented by shaded areas 635 in FIG. 6b. That is, the shaded areas represent regions of FIG. 6b where: Spectra$_n$($\lambda$)>Spectra_High ($\lambda$); and Spectra$_n$ ($\lambda$)<Spectra_High ($\lambda$).

An accumulated total of the integral of the deviation between the sensed spectrum 630 and the band 605, e.g. an accumulated total of the shaded areas in FIG. 6b, may be indicative of a degree of color saturation. That is, if the accumulated total is large, such as above a defined threshold, it may be determined that a high degree of color saturation is likely and, for example, automatic white-balancing should not be performed. Conversely, if the accumulated total is small, such as below a defined threshold, it may be determined that a low degree of color saturation is likely and, for example, automatic white-balancing can be reliably and/or relatively accurately performed.

Figure 6C:
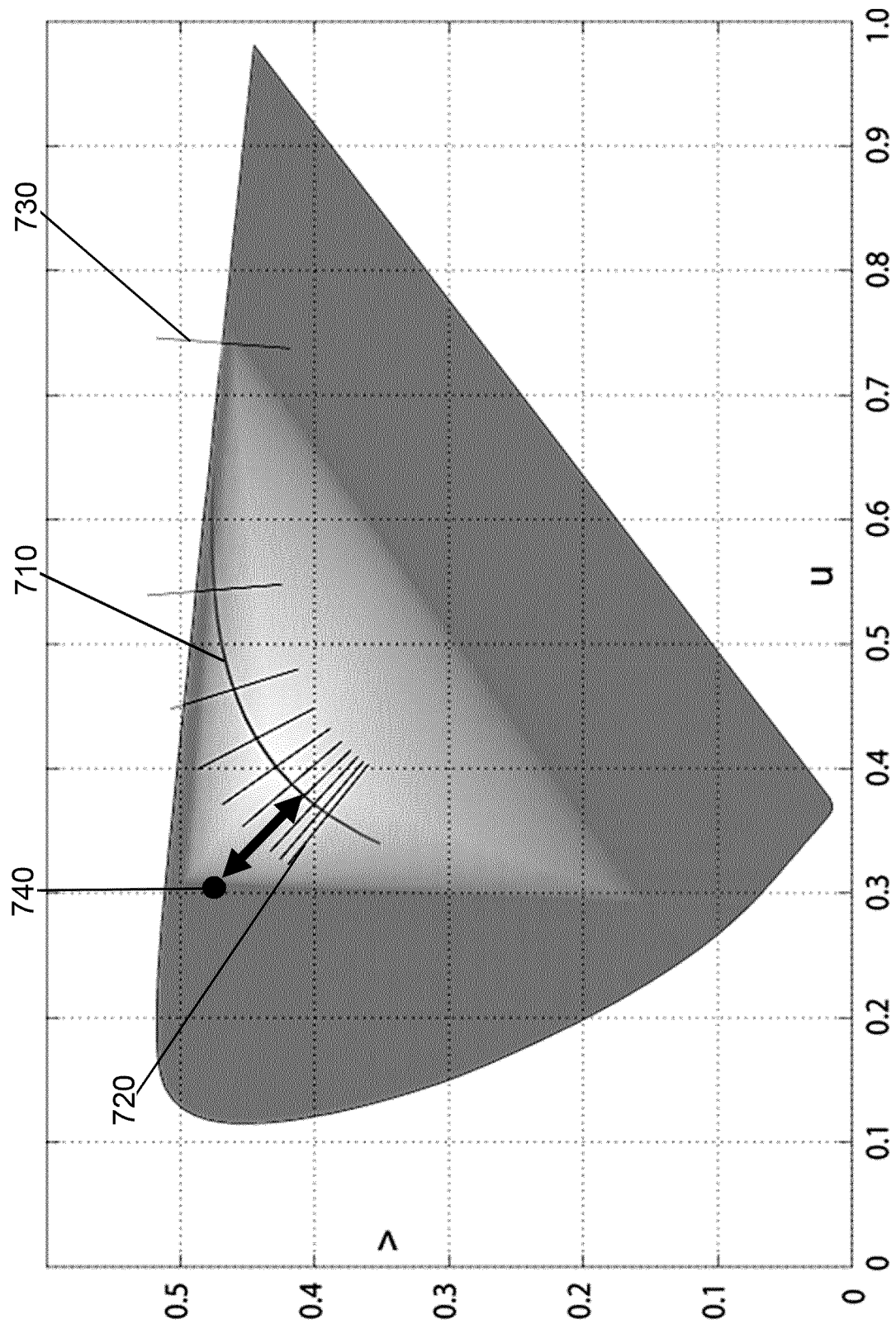
FIG. 6c depicts a chromaticity diagram.

FIG. 6c depicts a further example of how a sensed ambient light may be analyzed to determine a degree of color saturation that may be present in an image sensed by the image-sensor 120, as depicted at step 430 of FIG. 4b.

FIG. 6c depicts a chromaticity diagram. The chromaticity diagram of FIG. 6c is known in the art as a Uniform Chromaticity Space. One of skill in the art will appreciate that other that other chromaticity diagrams, in particular a chromaticity diagram defined by the "CIE 1960 Color Space", may also be applicable to the foregoing method.

A Planckian locus 710, also known as a "black body locus", is depicted in FIG. 6c. Running perpendicular to the Planckian locus are isothermal lines ranging from color temperatures of 1000K (line 720) to 10,000 k (line 730). All points along an isothermal line correspond to substantially the same CCT. A color value, e.g. a point on the chromaticity diagram, can be defined by a pair of "u, v" coordinates.

In one embodiment, the processor 110 may be configured to calculate a color value 740 from a reconstructed spectrum of an ambient light source sensed by the multispectral sensor 105. The color value may be represented as a point on the chromaticity diagram. That is, the processor 110 may be configured to calculate u, v coordinates from reconstructed spectra of an ambient light source.

The processor 110 may be configured to determine a distance 750 between the calculated color value 740 and a nearest point on the Planckian locus. The determined distance may be indicative of a degree of color saturation. For example, a threshold may be defined wherein a determined distance exceeding the threshold is considered to correspond to a color-saturated image. For example, in a preferred embodiment the threshold may corresponds to Δuv greater than 0.03, e.g. a distance from the Planckian locus of greater than 0.03.

In yet further embodiments, further criteria for determining a degree of color saturation may additionally or alternatively be applied. For example, upper and/or lower thresholds corresponding to maximum and minimum CCTs may be defined. For example, a reconstructed spectrum corresponding to a CCT of <2500K may be considered to be red-color saturated. Similarly, a reconstructed spectrum corresponding to a CCT of >7000K may be considered to be red-color saturated.

The Applicant discloses in isolation each individual feature described herein and any combination of two or more such features, to the extent that such features or combinations are capable of being carried out based on the specification as a whole in the light of the common general knowledge of a person skilled in the art, irrespective of whether such features or combinations of features solve any problems disclosed herein, and without limitation to the scope of the claims. The applicant indicates that aspects of the disclosure may consist of any such individual feature or combination of features. In view of the foregoing description it will be evident to a person skilled in the art that various modifications may be made within the scope of the disclosure.

The skilled person will understand that in the preceding description and appended claims, positional terms such as 'above', 'along', 'side', etc. are made with reference to conceptual illustrations, such as those shown in the appended drawings. These terms are used for ease of reference but are not intended to be of limiting nature. These terms are therefore to be understood as referring to an object when in an orientation as shown in the accompanying drawings.

Although the disclosure has been described in terms of preferred embodiments as set forth above, it should be understood that these embodiments are illustrative only and that the claims are not limited to those embodiments. Those skilled in the art will be able to make modifications and alternatives in view of the disclosure, which are contemplated as falling within the scope of the appended claims. Each feature disclosed or illustrated in the present specification may be incorporated in any embodiments, whether alone or in any appropriate combination with any other feature disclosed or illustrated herein.

LIST OF REFERENCE NUMERALS

| | |
|---|---|
| 100 | image-sensing device |
| 105 | multispectral sensor |
| 110 | processor |
| 115 | memory |
| 120 | image-sensor |
| 125 | cover |
| 130 | diffuser |
| 135 | viewing direction |
| 140 | viewing direction |
| 145 | field of view |
| 150 | field of view |
| 400 | first step |
| 405 | second step |
| 410 | first step |
| 415 | method step |
| 420 | method step |
| 425 | method step |
| 430 | method step |
| 435 | method step |
| 440 | method step |
| 445 | method step |
| 450 | method step |
| 455 | method step |
| 460 | method step |
| 465 | method step |
| 470 | method step |
| 475 | method step |
| 480 | method step |
| 510 | normalized spectra |
| 520 | normalized spectra |
| 530 | shaded areas |
| 605 | band |
| 610 | upper line |
| 620 | lower line |
| 630 | sensed spectrum |
| 710 | Planckian locus |
| 720 | line |
| 730 | line |
| 740 | color value |

The invention claimed is:

1. An image-sensing device comprising:
a multispectral sensor; and
a processor communicably coupled to the multispectral sensor,
wherein the processor is configured to determine an ambient light source corresponding to an output of the multispectral sensor,
further comprising an image sensor communicably coupled to the processor, wherein the processor is configured to adapt an image sensed by the image sensor based upon the ambient light source classification, and wherein a field of view of the multispectral sensor is greater than a field of view of the image sensor.

2. The image-sensing device of claim 1, wherein the processor is configured to adapt the image by white-balancing the image based upon one or more parameters of the ambient light source classification.

3. The image-sensing device of claim 1, wherein the predefined spectral data comprises a plurality of discrete spectra, each spectrum corresponding to a different ambient light source.

4. The image-sensing device of claim 3, wherein the processor is configured to determine the ambient light source classification by identifying a closest match between one of the discrete spectra and a spectrum of the ambient light source.

5. The image-sensing device of claim 4, wherein the processor is configured to reconstruct the spectrum of the ambient light source from the data corresponding to the output of the multispectral sensor.

6. The image-sensing device of claim 1, wherein the ambient light source classification is a color temperature or a color coordinate.

7. The image-sensing device of claim 1, wherein the processor is configured to provide an indication of an accuracy of the determination of the ambient light source classification.

8. The image sensing device of claim 1, wherein the processor is configured to provide an indication of a likelihood of color saturation of an/the image sensed by the image-sensing device.

9. The image-sensing device of claim 1, wherein at least one of:
   a spectral range of the multispectral sensor comprises visible light;
   a spectral range of the multispectral sensor comprises infra-red radiation; and/or
   a spectral range of the multispectral sensor comprises ultra-violet radiation.

10. The image-sensing device of claim 1, wherein at least one of:
    the multispectral sensor comprises a diffuser;
    the multispectral sensor comprises an optical filter, the optical filter configured to filter infra-red radiation and/or ultra-violet radiation.

11. The image sensing device of claim 1, wherein at least one of:
    the image sensor and the multispectral sensor are configurable to operate sequentially or in parallel; and
    a field of view of the image sensor and/or the multispectral sensor is configurable.

12. The image-sensing device of claim 1, wherein the device is at least one of: a cellular telephone, a camera, an image-recording device; and/or a video recording device.

13. A method for classifying an ambient light source, the method comprising the steps of:
    sensing a spectrum of light with a multispectral sensor having a field of view greater than a field of view of an image sensor associated therewith;
    determining an ambient light source classification based on a comparison of predefined spectral data to data corresponding to an output of the multispectral sensor; and
    adapting an image sensed by said image sensor based upon the ambient light source classification.

14. The method of claim 13, wherein the image is adapted by white-balancing the image based upon one or more parameters of the ambient light source classification.

15. The method of claim 13, wherein the predefined spectral data comprises a plurality of discrete spectra, each spectrum corresponding to a different ambient light source, and wherein the method further comprises the steps of:
    reconstructing the spectrum of the ambient light source from the data corresponding to the output of the multispectral sensor; and
    determining the ambient light source classification by identifying a closest match between one of the discrete spectra and a spectrum of the ambient light source.

16. A computer program, the computer program comprising instructions, which, when the program is executed by a computer, cause the computer to carry out the method according to claim 13.

17. A computer-readable medium having stored thereon the computer program of claim 16.

18. A data processing apparatus comprising a memory and a processor adapted to carry out the method according to claim 13.

* * * * *